US008727064B2

(12) United States Patent
Tai

(10) Patent No.: US 8,727,064 B2
(45) Date of Patent: May 20, 2014

(54) HYBRID INTERNAL COMBUSTION ENGINE AND AIR MOTOR SYSTEM AND METHOD

(71) Applicant: Mack Trucks, Inc., Greensboro, NC (US)

(72) Inventor: Chun Tai, Hagerstown, MD (US)

(73) Assignee: Mack Trucks, Inc., Greensboro, NC (US)

( * ) Notice: Subject to any disclaimer, the term of this patent is extended or adjusted under 35 U.S.C. 154(b) by 0 days.

(21) Appl. No.: 13/894,504

(22) Filed: May 15, 2013

(65) Prior Publication Data
US 2013/0247854 A1    Sep. 26, 2013

Related U.S. Application Data

(62) Division of application No. 13/434,941, filed on Mar. 30, 2012, now Pat. No. 8,517,137, which is a division of application No. 12/522,587, filed as application No. PCT/US2007/060671 on Jan. 18, 2007, now Pat. No. 8,177,016.

(51) Int. Cl.
*B60K 3/00* (2006.01)

(52) U.S. Cl.
USPC .......................................... 180/302; 701/105

(58) Field of Classification Search
USPC ..................... 180/302; 701/101–105, 112
See application file for complete search history.

(56) References Cited

U.S. PATENT DOCUMENTS

| 4,512,154 | A  | * | 4/1985  | Ueno .......................... 60/626 |
| 5,832,885 | A  | * | 11/1998 | Moyer ...................... 123/90.16 |
| 5,992,390 | A  | * | 11/1999 | Moyer .......................... 123/481 |
| 6,223,846 | B1 | * | 5/2001  | Schechter ..................... 180/165 |
| 7,050,900 | B2 | * | 5/2006  | Miller et al. ................. 701/103 |
| 2009/0254246 | A1 | * | 10/2009 | Yang et al. ..................... 701/36 |
| 2010/0086414 | A1 | * | 4/2010  | Tai ................................ 417/34 |
| 2013/0096800 | A1 | * | 4/2013  | Tai ............................... 701/100 |

* cited by examiner

*Primary Examiner* — Jeffrey J Restifo
*Assistant Examiner* — Erez Gurari
(74) *Attorney, Agent, or Firm* — WRB-IP LLP

(57) ABSTRACT

A hybrid internal combustion engine and air motor system is provided and includes at least one chamber having a drivable member and at least one intake valve and at least one exhaust valve, and a reservoir connected to the chamber through at least one of the intake valve and the exhaust valve. The system further comprises a computer configured to calculate air compressor efficiency during an air compressor mode of operation and select an intake and exhaust valve opening and closing timing sequence for maximizing air compressor efficiency and/or a computer configured to calculate air motor efficiency during an air motor mode of operation and select an intake and exhaust valve opening and closing timing sequence for maximizing air motor efficiency. A method for selecting an intake and exhaust valve opening and closing timing sequence for maximizing air compressor efficiency and/or for selecting an intake and exhaust valve opening and closing timing sequence for maximizing air motor efficiency is also disclosed.

1 Claim, 7 Drawing Sheets

HYBRID INTERNAL COMBUSTION ENGINE AND AIR MOTOR SYSTEM AND METHOD

The present application is a divisional of U.S. application Ser. No. 13/434,941, filed Mar. 30, 2012, which is a divisional of U.S. application Ser. No. 12/522,587, filed Jul. 9, 2009, now U.S. Pat. No. 8,177,016, issued May 15, 2012, which is a U.S. national stage application of PCT/US2007/060671, filed Jan. 18, 2007, both of which are incorporated by reference.

BACKGROUND AND SUMMARY

The present invention relates generally to hybrid internal combustion engine and air motor systems and methods and, more particularly, to such systems and methods wherein intake and exhaust valve opening and closing timing sequences during air motor or air compressor modes of operation are selected to maximize air motor efficiency or air compressor efficiency.

Typical city driving patterns for vehicles include many accelerations and decelerations. A significant portion of fuel energy is spent in accelerating the vehicle. This energy is wasted during subsequent decelerations. A pneumatic hybrid engine captures and reuses some of this energy. During braking, the engine can utilize the braking energy to work as a compressor, pumping compressed air into an on-board tank. Later, during acceleration, the engine can be powered by the stored compressed air with or without burning diesel fuel to get up to speed or until the compressed air is depleted. The additional work performed by the compressed air permits a reduction in the quantity of fuel needed to achieve the required engine power. In this way, the engine efficiency can be increased, and the vehicle fuel economy can be improved.

It is desirable to provide a method for controlling air flow in air compressor modes and air motor modes of such pneumatic-hybrid vehicles. It is also desirable to provide a system arranged to control air flow in air compressor modes and air motor modes of such air-hybrid systems.

It is also desirable to provide a method for transitioning from air motor mode to internal combustion engine mode in a manner that minimizes changes in engine torque. It is also desirable to provide a system arranged to transition from air motor mode to internal combustion engine mode in a manner that minimizes changes in engine torque.

According to an aspect of the present invention, a method is provided for operating a hybrid internal combustion engine and air motor system comprising at least one chamber having a drivable member and at least one intake valve and at least one exhaust valve, and a reservoir connected to the chamber through at least one of the intake valve and the exhaust valve. The method comprises, in an air compressor mode of operation, calculating air compressor efficiency according to the following equation:

$$\eta AC = \text{efficiency of air compressor} = -\frac{dA}{dW}$$

and wherein $$A = \text{thermodynamic availability in resevoir}$$
$$= (E - E_o) + P_o * (V - V_o) - T_o * (S - S_o)$$

dA=rate of change of A
E=Internal energy of air in reservoir=f(m, $T_t$)
m=mass of air in reservoir=$P_t$*V/(R*$T_t$)
$T_t$=Temperature of air in reservoir
$P_t$=Pressure of air in reservoir
V=Volume of reservoir at $P_t$ and $T_t$
R=gas constant
$E_o$=Internal energy of air in reservoir at ambient pressure and temperature
$P_o$=Ambient pressure
$V_o$=Volume of air in reservoir at ambient pressure and temperature
$T_o$=Temperature of ambient air
S=Entropy of air in reservoir=f($P_t$, $T_t$)
$S_o$=Entropy of air in reservoir at ambient pressure and temperature
POW=Engine brake power=N*$T_b$
N=Engine speed (rev/time)
$T_b$=Engine brake torque
W=Engine brake work=POW dt
dW=rate of change of W An intake and exhaust valve opening and closing timing sequence is selected for maximizing air compressor efficiency so that $$\frac{d(\eta AC)}{d(\text{Valve Timing})} = 0$$

and $$\frac{d^2(\eta AC)}{d^2(\text{Valve Timing})} < 0.$$

According to another aspect of the present invention, a method for operating a hybrid internal combustion engine and air motor system comprising at least one chamber having a drivable member and at least one intake valve and at least one exhaust valve, and a reservoir connected to the chamber through the exhaust valve is provided. The method comprises, in an air motor mode of operation, calculating air motor efficiency according to the following equation:

$$\eta AM = \text{efficiency of air motor} = -\frac{dW}{dA}$$

and wherein $$A = \text{thermodynamic availability in resevoir}$$
$$= (E - E_o) + P_o * (V - V_o) - T_o * (S - S_o)$$

dA=rate of change of A
E=Internal energy of air in reservoir=f(m, $T_t$)
m=mass of air in reservoir=$P_t$*V/(R*$T_t$)
$T_t$=Temperature of air in reservoir
$P_t$=Pressure of air in reservoir
V=Volume of reservoir at $P_t$ and $T_t$
R=gas constant
$E_o$=Internal energy of air in reservoir at ambient pressure and temperature
$P_o$=Ambient pressure
$V_o$=Volume of air in reservoir at ambient pressure and temperature
$T_o$=Temperature of ambient air S = Entropy of air in reservoir = $f(P_t, T_t)$ $S_o$ = Entropy of air in reservoir at ambient pressure and temperature POW = Engine brake power = $N*T_b$ N = Engine speed (rev/time)

$T_b$ = Engine brake torque

W = Engine brake work = POW dt dW = rate of change of W

An intake and exhaust valve opening and closing timing sequence is selected for maximizing air motor efficiency so that $$\frac{d(\eta AM)}{d(\text{Valve Timing})} = 0$$

and $$\frac{d^2(\eta AM)}{d^2(\text{Valve Timing})} < 0.$$

According to another aspect of the present invention, a method is provided for controlling a transition from air motor operation to internal combustion operation in a hybrid internal combustion engine and air motor system. The hybrid internal combustion engine and air motor system comprises (a) a chamber including at least one intake valve, at least one outlet valve, and a drivable member, (b) an air inlet line including, upstream of the at least one intake valve, an air inlet line valve, (c) an internal combustion engine mode exhaust line comprising an internal combustion engine mode exhaust line valve downstream of the at least one exhaust valve, (d) a compressed air line comprising a compressed air line valve downstream of the at least one exhaust valve and upstream of a reservoir, and (e) an air motor mode exhaust line comprising an air motor mode exhaust valve downstream of the at least one intake valve and the air inlet line valve. The method comprises transitioning from operation in the air motor mode to operation in the internal combustion engine mode by performing the steps of: a) partially opening the internal combustion engine mode exhaust line valve; b) partially closing the air motor exhaust line valve; c) partially closing the compressed air line valve; d) completely opening the air inlet line valve after performing steps a), b), and c); and e) changing an intake and exhaust valve opening and closing timing sequence from an air motor timing sequence to an internal combustion engine timing sequence.

In accordance with another aspect of the present invention, a method is provided for operating a hybrid internal combustion engine and air motor system comprising at least one chamber having a drivable member and at least one intake valve and at least one exhaust valve, and a reservoir connected to the chamber through at least one of the intake valve and the exhaust valve. According to the method, in an air compressor mode of operation, air compressor efficiency ($\eta AC$) is calculated, and an intake and exhaust valve opening and closing timing sequence is selected for maximizing air compressor efficiency so that $$\frac{d(\eta AC)}{d(\text{Valve Timing})} = 0$$

and $$\frac{d^2(\eta AC)}{d^2(\text{Valve Timing})} < 0.$$

In accordance with another aspect of the present invention, a method is provided for operating a hybrid internal combustion engine and air motor system comprising at least one chamber having a drivable member and at least one intake valve and at least one exhaust valve, and a reservoir connected to the chamber through the exhaust valve. According to the method, in an air motor mode of operation, air motor efficiency ($\eta AM$) is calculated, and an intake and exhaust valve opening and closing timing sequence is selected for maximizing air motor efficiency so that $$\frac{d(\eta AM)}{d(\text{Valve Timing})} = 0$$

and $$\frac{d^2(\eta AM)}{d^2(\text{Valve Timing})} < 0.$$

In accordance with another aspect of the present invention, a hybrid internal combustion engine and air motor system is provided and comprises at least one chamber having a drivable member and at least one intake valve and at least one exhaust valve, and a reservoir connected to the chamber through at least one of the intake valve and the exhaust valve. The system further comprises a computer configured to calculate air compressor efficiency ($\eta AC$) during an air compressor mode of operation and select an intake and exhaust valve opening and closing timing sequence for maximizing air compressor efficiency so that $$\frac{d(\eta AC)}{d(\text{Valve Timing})} = 0$$

and $$\frac{d^2(\eta AC)}{d^2(\text{Valve Timing})} < 0.$$

In accordance with another aspect of the present invention, a hybrid internal combustion engine and air motor system is provided and comprises at least one chamber having a drivable member and at least one intake valve and at least one exhaust valve, and a reservoir connected to the chamber through at least one of the intake valve and the exhaust valve. The system further comprises a computer configured to calculate air motor efficiency ($\eta AM$) during an air motor mode of operation and select an intake and exhaust valve opening and closing timing sequence for maximizing air motor efficiency so that $$\frac{d(\eta AM)}{d(\text{Valve Timing})} = 0$$

and $$\frac{d^2(\eta AM)}{d^2(\text{Valve Timing})} < 0.$$

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1A:
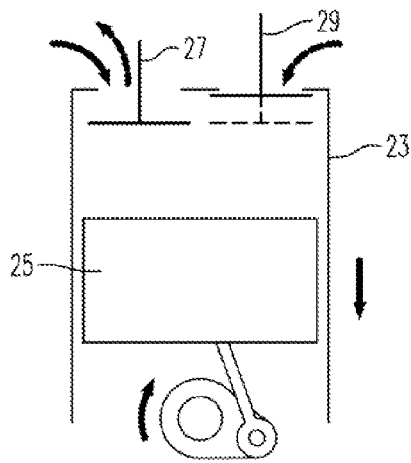
FIGS. 1A-1D show a cylinder of a system according to an embodiment of the present invention during different phases of a system operating cycle.

A hybrid internal combustion engine and air motor system 21 (generally referred to as a "system", "engine", or "motor" herein) is shown in FIGS. 2-6. The system 21 can be used to drive a variety of machines and is presently considered to have particular applicability in machines such as motor vehicles. The system 21 typically includes at least one chamber that may be of the type as shown in FIGS. 1A-1D, such as a cylinder 23, having a piston, such as a piston 25, and at least one intake valve 27 and at least one exhaust valve 29. While the invention will be described primarily in connection with a system 21 comprising a cylinder in the form of the cylinder 25 and a piston in the form of the piston 25, it will be appreciated that the invention is adapted to be used with other types of chamber/piston arrangements, such as rotary engines (not shown). It will also be appreciated that the invention can comprise a system having a plurality of chambers or cylinders. Typically, the cylinder 23 will comprise a plurality of cylinders, e.g., 23a-23f, each with a respective piston and at least one, often two, respective intake valve(s) 27a-27f and at least one, often two, respective exhaust valve(s) 29a-29f.

The system 21 further comprises a reservoir 31 connected to the cylinder 23 through at least one of the intake valve 27 and the exhaust valve 29. The system 21 can also comprise an air inlet line 33 that may include, in parallel, a first branch 35 comprising a charge air cooler valve 37 and a second branch 39 comprising a compressor 41 of a turbocharger 43 and, downstream of the first and second branches and upstream of the at least one intake valve 27, a charge air cooler 45 and an air inlet line valve 47. The charge air cooler valve 37 permits air flow to substantially bypass the compressor 41 and the charge air cooler 45 when the charge air cooler valve 37 is open and, when it is closed, ensures that air passes through the compressor and the charge air cooler.

The system 21 can also comprise an IC mode exhaust line 49 that can comprise an IC mode exhaust line valve 51 downstream of the at least one exhaust valve 29 and upstream of a turbine 55 of the turbocharger 43 in the IC mode exhaust line 49. The system 21 can also comprise a compressed air line 57 that can comprise a compressed air line valve 59 downstream of the at least one exhaust valve 29 and upstream of the reservoir 31. The system 21 can also comprise an AM mode exhaust line 61 that can comprise an AM mode exhaust valve 63 downstream of the at least one intake valve 27 and the air inlet line valve 47.

The system 21 can comprise substantially any type of internal combustion engine arrangement, however, it shall be described in connection with a diesel engine arrangement. In the illustrated embodiments, the diesel engine can comprise an exhaust gas recirculation (EGR) line 65 between the IC mode exhaust line 49 and the air inlet line 33, typically joining the air inlet line upstream of the air inlet line valve 47. The EGR line 61 can comprise an EGR valve 67 and an EGR cooler 69. The IC mode exhaust line 49 can comprise aftertreatment devices such as a diesel particulate filter 71 and the like.

Figure 3:
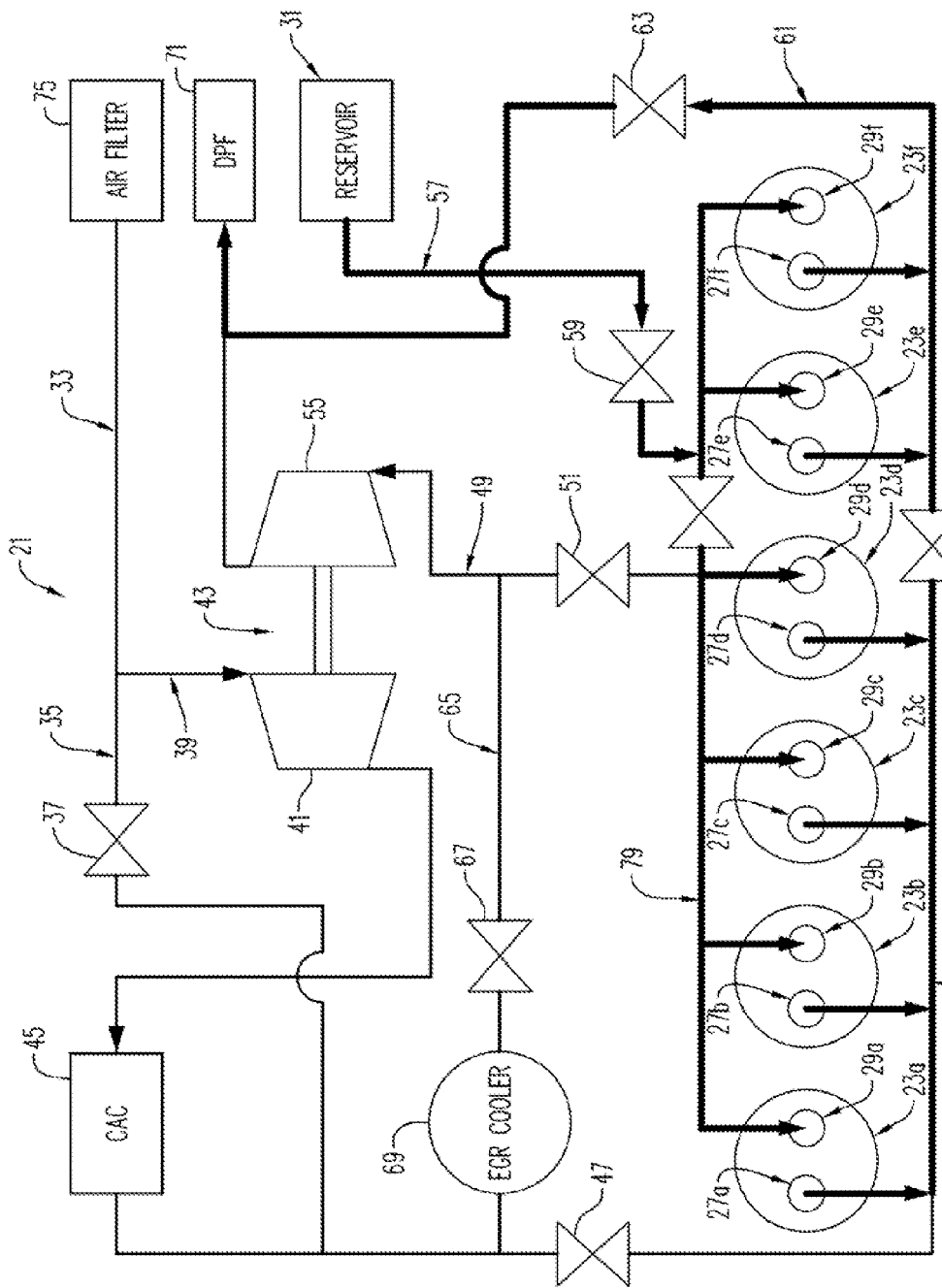
FIG. 3 schematically shows a system according to an embodiment of the present invention wherein the system is operated in an air motor mode.
Figure 4:
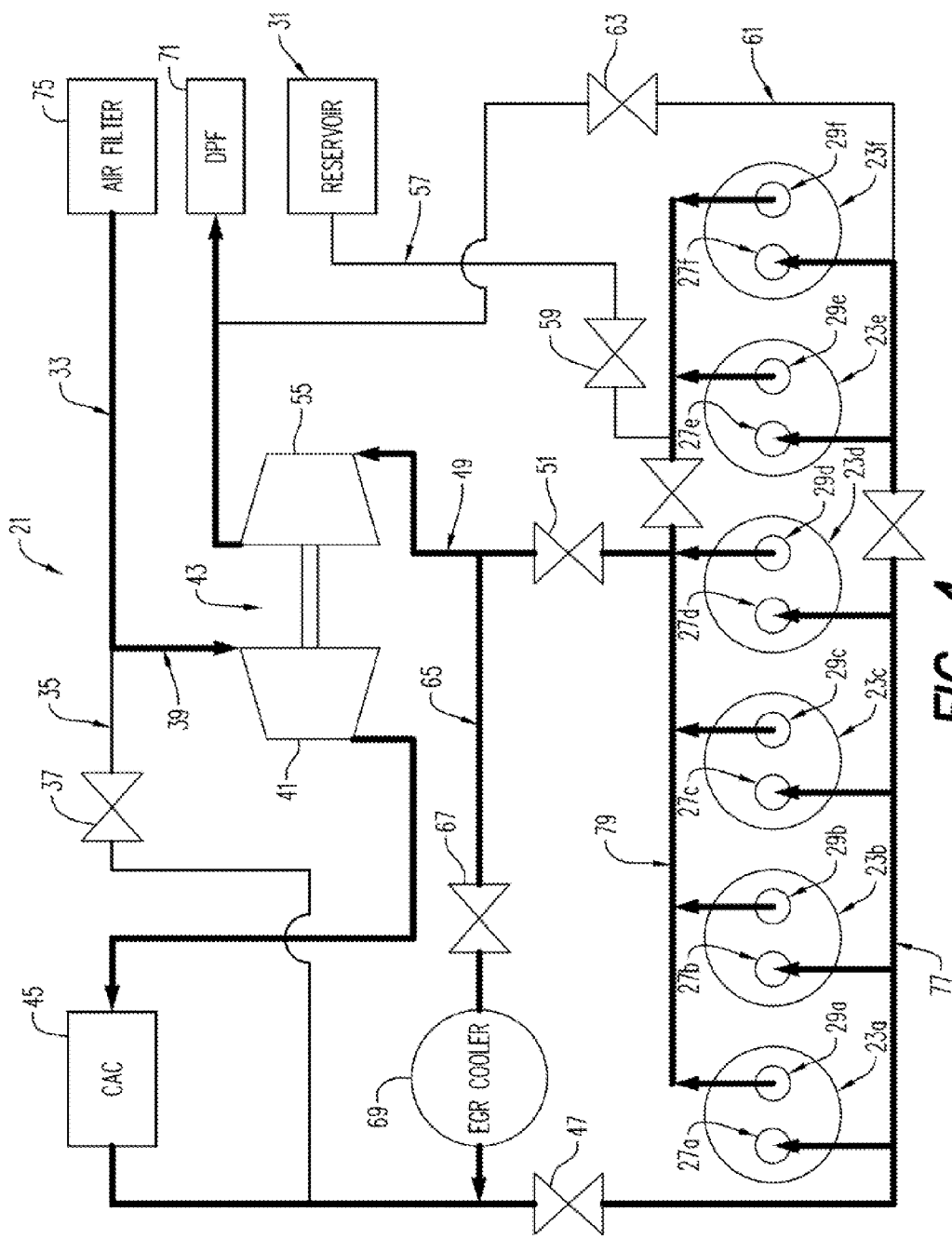
FIG. 4 schematically shows a system according to an embodiment of the present invention wherein the system is operated in an internal combustion engine mode.

The system 21 is operable in one or more of what shall be referred to as an air compressor (AC) mode (FIG. 2), an air motor (AM) mode (FIG. 3), and an internal combustion engine (IC) mode (FIG. 4). When operating in an AM mode or an IC mode, the system 21 is primarily used to deliver energy, such as to power a vehicle. When operating in an AC mode, the system 21 is primarily used to absorb kinetic energy, such as during engine braking, and store it in the form of compressed air. It is also possible to simultaneously operate the system 21 in different modes, such as by injecting compressed air into a cylinder on a first downward stroke (AM mode) of a piston and operating in IC mode during a second downward stroke, or by operating a multi-cylinder engine so that some cylinders are run in AM mode and some are run in IC mode, or so that some cylinders are run in IC mode and others are run in AC mode.

In the AC mode, an opening and closing timing sequence for the intake valve 27 and for the exhaust valve 29 can be selected to maximize air compressor efficiency ($\eta AC$), i.e., so that:

$$\frac{d(\eta AC)}{d(\text{Valve Timing})} = 0$$

and $$\frac{d^2(\eta AC)}{d^2(\text{Valve Timing})} < 0$$

Similarly, in the AM mode, an opening and closing timing sequence for the intake and exhaust valves 27 and 29 can be selected for maximizing air motor efficiency ($\eta AM$), i.e., so that:

$$\frac{d(\eta AM)}{d(\text{Valve Timing})} = 0$$

and $$\frac{d^2(\eta AM)}{d^2(\text{Valve Timing})} < 0$$

Air compressor efficiency at different intake and exhaust valve timing sequences can be calculated according to the following equation:

$$\eta AC = \text{efficiency of air compressor} = -\frac{dA}{dW}$$

and wherein $$A = \text{thermodynamic availability in resevoir}$$
$$= (E - E_o) + P_o * (V - V_o) - T_o * (S - S_o)$$

dA=rate of change of A
E=Internal energy of air in reservoir=f(m, $T_t$)
m=mass of air in reservoir=$P_t*V/(R*T_t)$
$T_t$=Temperature of air in reservoir
$P_t$=Pressure of air in reservoir
V=Volume of reservoir at $P_t$ and $T_t$
R=gas constant
$E_o$=Internal energy of air in reservoir at ambient pressure and temperature
$P_o$=Ambient pressure
$V_o$=Volume of air in reservoir at ambient pressure and temperature
$T_o$=Temperature of ambient air
S=Entropy of air in reservoir=f($P_t$, $T_t$)
$S_o$=Entropy of air in reservoir at ambient pressure and temperature
POW=Engine brake power=$N*T_b$
N=Engine speed (rev/time)
$T_b$=Engine brake torque
W=Engine brake work=POW dt
dW=rate of change of W Similarly, in an AM mode of operation, air motor efficiency can be calculated at different intake and exhaust valve timing sequences according to the following equation:

$$\eta AM = \text{efficiency of air motor} = -\frac{dW}{dA}$$

Figure 2:
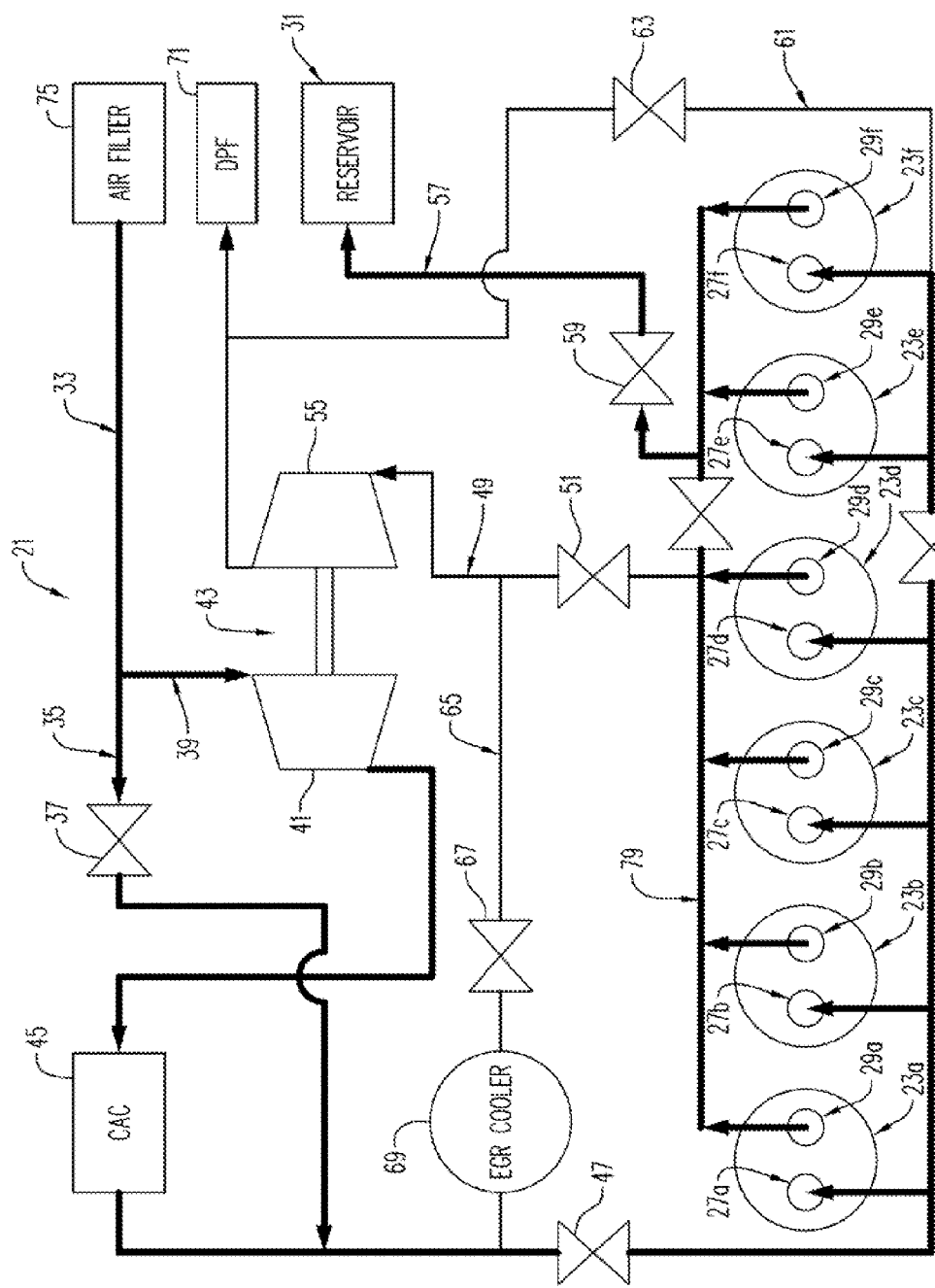
FIG. 2 schematically shows a system according to an embodiment of the present invention wherein the system is operated in an air compressor mode.

To ascertain maximum air compressor efficiency and air motor efficiency under different circumstances, e.g., engine speeds, reservoir pressures, ambient temperatures, etc., can be ascertained, a test system can be set up. For example, in AC mode, as seen in FIG. 2, the intake valve 27 can be open while the volume of the cylinder 23 is increasing (piston 25 downstroke), and while the cylinder gets filtered outside air through the air inlet line 33. The IC engine mode exhaust line valve 51 can be closed and the compressed air line valve 59 can be opened. Air that is compressed in the cylinder exits the exhaust valve 29 and is delivered to the reservoir 31 through the compressed air line 57. In the AC mode, braking of the system 21 can occur, and the amount of braking is not controlled by restriction which destroys thermodynamic availability and in turn reduces the engine efficiency. Instead, the amount of braking is controlled by carefully selecting opening and closing timings of the intake and exhaust valves.

For example, to achieve a targeted amount of braking power at a given speed of the system 21 and a given reservoir 31 pressure, a set of valve timings can be fetched from a stored table or database, which can be pre-determined through a suitable optimization process. In one suitable form of optimization process, the system 21 can be set up in a dynamometer test cell (not shown). Fuel injection can be shut off. The reservoir 31 pressure can be regulated to a constant pressure.

The system 21 can be motored by the dynamometer to run in AC mode. A control system (not shown) is set up to sweep through the exhaust valve 29 opening (EVO) timing, exhaust valve closing (EVC) timing, and intake valve 27 opening (IVO) timing while maintaining a constant intake valve closing (IVC) timing and a constant system speed (N). Meanwhile a data collection system (not shown) collects the ambient air pressure ($P_o$), ambient air temperature ($T_o$), reservoir pressure ($P_t$), reservoir temperature ($T_t$), system speed (N) and system brake torque (Tb). Using the collected data within each system cycle, system brake power (W) can be calculated: W=N*Tb.

Also, the internal energy (E) of the air in reservoir can be calculated once $P_t$ and $T_t$ are measured; V is reservoir volume at $P_t$ and $T_t$, usually a constant so that the volume of the reservoir 31 at ambient conditions ($V_o$) is ordinarily equal to V; S is entropy of the air in the tank, which is a function of $P_t$ and $T_t$; $E_o$ and $S_o$ are the corresponding properties at the ambient condition. For a reservoir 31 of constant volume V, the air mass (m) can be calculated according to the well known equation: m=P*V/(R*T). Energy (E) of gas in the reservoir 31 is a function of air mass (m) and temperature ($T_t$) in the reservoir. The thermodynamic availability (A) in reservoir equals $(E-E_o)+P_o*(V-V_o)-T_o*(S-S_o)$.

Efficiency of the system in the AC mode ($\eta AC$) can be determined according to the equation $-dA/dW$, where dA is the rate of change of the thermodynamic availability of air collected in the reservoir and dW is the rate of change of system brake work.

Next, the change in efficiency of the system 21 in the AC mode can be determined at different valve timings. When $d(\eta AC)/d(\text{valve timing})=0$, a particular valve timing will be considered to be the optimum valve timing for the conditions under investigation. For example, if the valve timing is EVO, EVO will be selected as the optimum timing when $d(\eta AC)/d(EVO)$ is small enough, preferably equal to 0. Optimum timing can be determined by searching through all possible values for EVO. Alternatively, timing can be optimized using an analytical equation of $\eta AC=f(EVO)$ which can be constructed using measured values; the optimal EVO can be calculated at $df/d(EVO)=0$.

To illustrate, during a first phase of testing, EVO is set at 330° of crank angle (CA), the system 21 is run and yields an efficiency ($\eta AC_{330}$)=0.7. During a second phase of testing, EVO is set at 331° C.A, the system is run and yields an efficiency $\eta AC_{331}$=0.71. Since EVO takes discrete values, $d(\eta AC)/d(EVO)$=delta($\eta AC$)/delta(EVO)=0.01 in this case. This illustrates a somewhat exhaustive technique of searching through all possible values for EVO.

To illustrate another approach, the system 21 can be run at three or more EVO timings, say at EVO=330°, 331°, 332°, and 333° CA. It will be assumed that, at these EVO values, efficiency $\eta AC$=0.7, 0.71, 0.72, 0.715, respectively. An equation can be constructed: $\eta AC=C0+C1*EVO+C2*EVO^2$. This equation assumes the shape of the efficiency curve can be approximated as a second order polynomial, which is believed to be a fairly reasonable assumption as long as the optimal value lies between the selected points. C0, C1 and C2 can be calculated by fitting the four pairs of data to the equation. Three sets of values can be plugged into the equation above, providing:

$$\eta AC_1 = C0 + C1*EVO_1 + C2*EVO_1^2$$

$$\eta AC_2 = C0 + C1*EVO_2 + C2*EVO_2^2$$

$$\eta AC_3 = C0 + C1*EVO_3 + C2*EVO_3^2$$

Next, the following definitions are provided:
B=[$\eta AC_1, \eta AC_2, \eta AC_3$]
A=[1 $EVO_1$ $EVO_1\hat{}2$
 1 $EVO_2$ $EVO_2\hat{}2$
 1 $EVO_3$ $EVO_3\hat{}2$]
X=[C0 C1 C2]
Then: AX=B
Therefore: X=$A^{-1}$B
Then, the derivative of the second order equation above is:
d($\eta$AC)/d(EVO)=C1+2*C2*EVO.
When d($\eta$AC)/d(EVO)=0 then −C1=2*C2*EVO and the optimal EVO=−C1/(2*C2).

Once an optimal value for EVO is calculated at the first IVC, the test is repeated at a next IVC timing, system speed, and reservoir pressure point, until all the IVC timings, engine speeds and reservoir pressures are tested. In an iterative process, where several variables affect efficiency, all of the variables (e.g., IVC, IVO, EVC) except one (e.g., EVO) can be frozen, and tests can be run by varying that variable. Next, all of the variables (e.g., IVO, EVC, EVO) except another one (e.g., IVC) can be frozen, and tests can be run by varying that variable, etc., until tests have been performed for all of the variables. Then further tests can be run to determine, for example, what optimal values are for one variable when an optimal value for another one of the variables is selected. The optimum timings (IVC, IVO, EVO, EVO) at a given system speed and reservoir pressure are then stored in an engine control unit, e.g., computer, and can be used for system control in the AC mode.

As seen in FIG. 3, in AM mode operation, the intake valve 25 is open while the cylinder 23 volume is increasing and the cylinder receives air from the reservoir 31 through the compressed air line 57 which, in the illustrated embodiments, is connected to the exhaust valve 29 of the cylinder. The AM mode exhaust valve 63 is open while the volume of the cylinder 23 is decreasing, and exhaust air from the cylinder exits, in this embodiment, through the cylinder intake valve 27 to the AM mode exhaust line 61. Acceleration of the system 21 can be controlled by carefully set valve timings. For a targeted acceleration power at a given system speed, a set of valve timings is fetched from a stored table, which can be predetermined through an optimization process similar to that described in connection with optimization of the AC mode efficiency, except that the objective is to maximize air motor efficient ($\eta$AM), which is defined as $\eta$AM=−dW/dA.

As seen in FIG. 4, during normal operation in IC mode, fresh charge air enters through the air inlet line 33, usually after passing through an air filter 75. Ordinarily, the CAC valve 37 in the first branch 35 of the air inlet line is closed and the charge air is directed through the second branch 39 through the compressor 41 of the turbocharger 43 and then on to the CAC 45. The charge air then passes through the air inlet line valve 47 and on to the intake valve of the cylinder. As seen in FIG. 4, there is often an intake manifold 77 leading to a plurality of intake valves 27a-27f of a plurality of cylinders 23a-23f, respectively.

Figure 5:
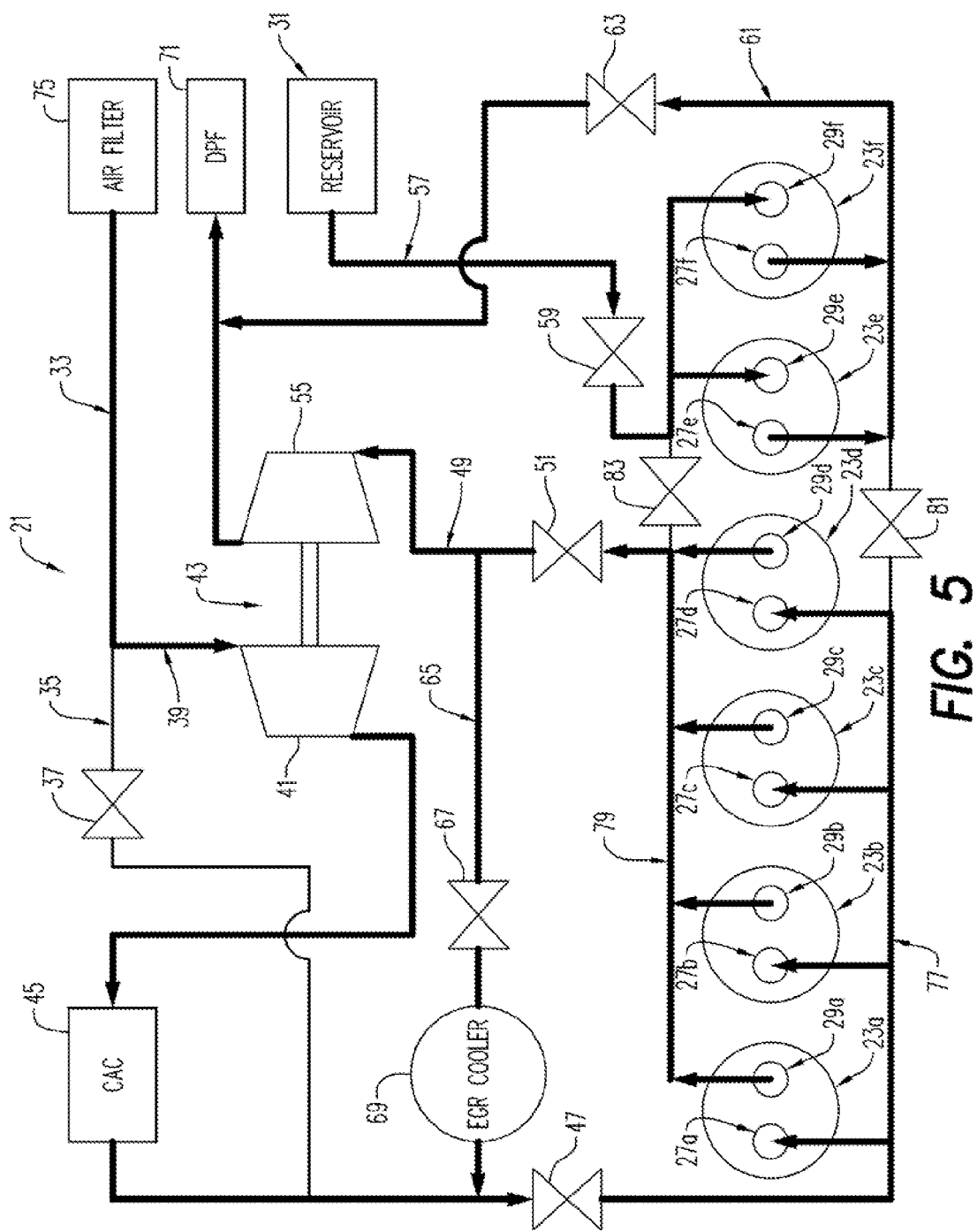
FIG. 5 schematically shows a system according to an embodiment of the present invention wherein the system is operated in both an internal combustion engine mode and in an air motor mode.

In the embodiment shown in FIG. 4, the intake manifold 77 also functions in part as the AM mode exhaust line 61 during AM mode operation. However, during IC mode operation, the AM mode exhaust valve 63 is typically closed, except when the system is configured to operate simultaneously in IC mode and AM mode, e.g., when certain cylinders operate in IC mode and others operate in AM mode as shown in FIG. 5.

In IC mode operation as shown in FIG. 4, the IC mode exhaust line valve 51 is typically open and the compressed air line valve 59 is typically closed. Internal combustion exhaust travels through the IC mode exhaust line 49, usually passing through the turbine 55 of the turbocharger 43. Some exhaust gas may be diverted through the EGR line 65 and EGR cooler 69 to re-enter the air inlet line 33, usually upstream of the intake manifold 77, by opening the EGR valve 67. Exhaust gas downstream of the turbine 55 is typically directed to exhaust aftertreatment devices such as the DPF 71.

In an embodiment of the AM mode operation seen in FIG. 3, the air inlet line valve 47 is typically closed, as is the IC mode exhaust line valve 51. The compressed air line valve 59 and the AM mode exhaust valve 63 are typically open. Compressed air from the reservoir 31 flows through the compressed air line 57 to the exhaust manifold 79 which, in AM mode in this embodiment, functions as an intake manifold. From the exhaust manifold 79, the compressed air flows to the cylinders 23a-23f as the exhaust valves 29a-29f in those cylinders—which function as intake valves in this embodiment—open to force the pistons in those cylinders down. When an exhaust valve of a cylinder closes, an intake valve—which functions as an exhaust valve in this embodiment—subsequently opens and the air in the cylinder is exhausted through the intake valve to the intake manifold—which functions as an exhaust manifold in this embodiment—and through the AM mode exhaust line, which may connect to the IC mode exhaust line, usually downstream of the turbine 55 and then flow to the aftertreatment equipment such as the DPF 71.

In an embodiment of the AC mode operation shown in FIG. 2, the CAC valve 37 and the air inlet line valve 47 will typically be open, and the IC mode exhaust line valve 51 and the AM mode exhaust valve 63 will typically be closed. In addition, the compressed air line valve 59 will be open. The pistons in the cylinders 23a-23f will typically be reciprocating during, for example, engine braking, although, as shown in FIG. 6, some cylinders may be operating in an IC engine mode while others operate in an AC mode and pistons in the AC mode cylinders are moved as the result of IC mode operation of the other cylinders moving the pistons in those cylinders.

Air flows through the air inlet line 33 to the intake manifold 77 and, when the intake valves 27a-27f open, air flows into the cylinders 23a-23f, respectively. During downstrokes of the respective pistons in the cylinders 23a-23f, the valves 23a-23f are opened for a period and the cylinders fill with fresh air. The valves 27a-27f are closed and the pistons move upward in the cylinders 23a-23f. When the pistons move upward in the cylinders 23a-23f, the exhaust valves 29a-29f are opened, and the air in the cylinders is pushed into the exhaust manifold 79, which is connected to the reservoir 31 via the compressed air line 57, and the reservoir is thereby pressurized.

FIG. 5 shows an embodiment of the system 21 wherein certain cylinders 23a-23d operate in IC engine mode and other cylinders 23e-23f operate in AM mode. In this embodiment, an intake manifold valve 81 can be closed to divide the intake manifold into two sections, a first section associated with cylinders 23a-23d functioning as an intake manifold in the conventional manner of the IC engine mode, and a second section associated with cylinders 23e-23f functioning as an exhaust manifold in the manner of the AM mode. An exhaust manifold valve 83 can be closed to divide the exhaust manifold 79 into two sections, the first section associated with the cylinders 23a-23d and the second section connected to the cylinders 23e-23f. The cylinders 23a-23d are exhausted through the exhaust manifold 79 in the conventional manner for IC mode operation, i.e., to the IC mode exhaust line 49, while the cylinders 23e-23f are exhausted through the intake manifold 77 to the AM mode exhaust line 61, which may be connected to the IC mode exhaust line.

Figure 6:
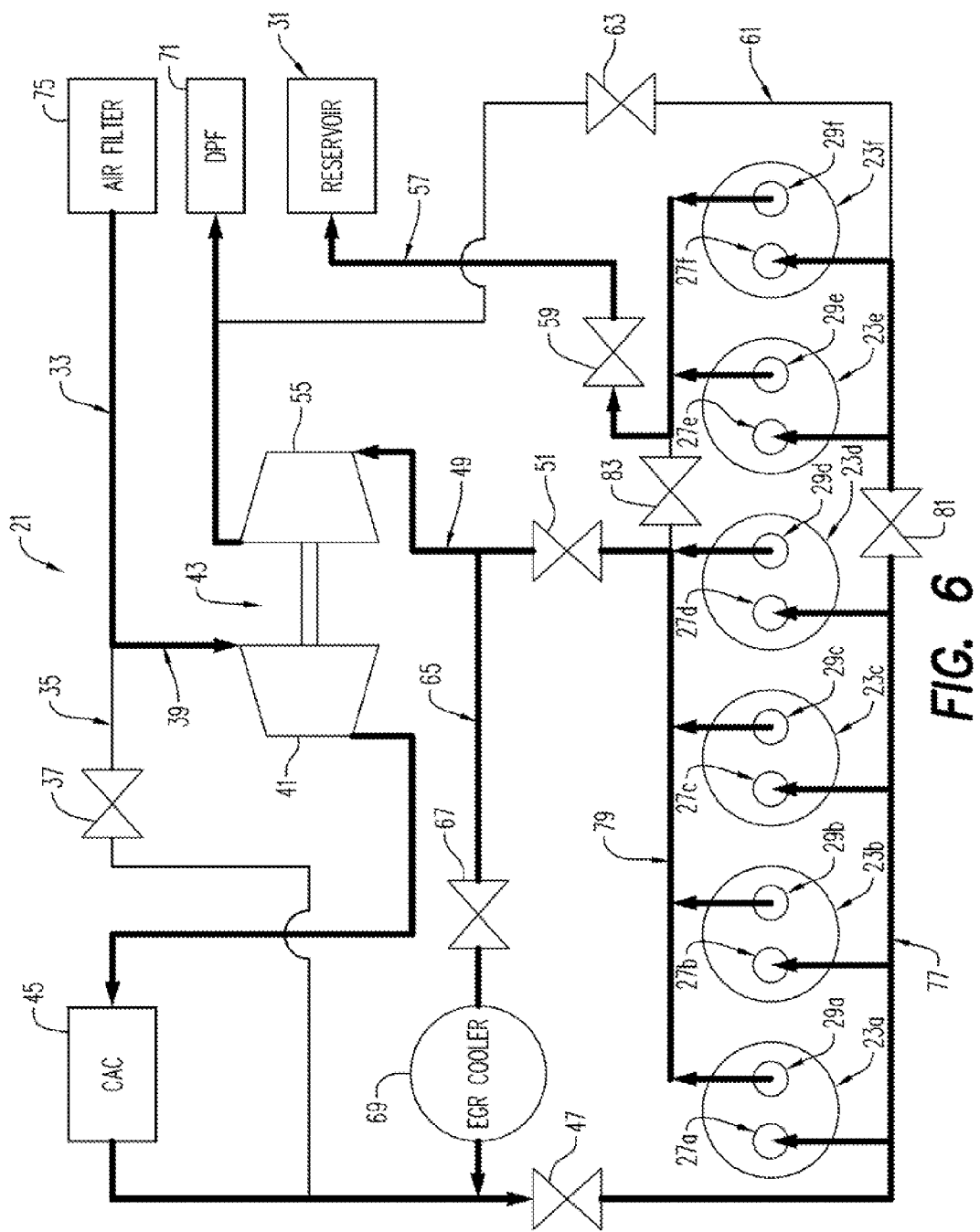
FIG. 6 schematically shows a system according to an embodiment of the present invention wherein the system is operated in both an internal combustion engine mode and in an air compressor mode.

FIG. 6 shows an embodiment of the system 21 wherein certain cylinders 23a-23d operate in IC engine mode and other cylinders 23e-23f operate in AC mode. In this embodiment, the intake manifold valve 81 can be open so that air enters the cylinders 23a-23f through the intake valves 27a-27f in the conventional manner for IC mode operation or AC mode operation. Fuel injection occurs in cylinders 23a-23d in the conventional manner for IC mode operation, while no fuel injection occurs in cylinders 23e-23f. The exhaust manifold valve 83 can be closed to divide the exhaust manifold 79 into two sections, the first section associated with the cylinders 23a-23d and the second section connected to the cylinders 23e-23f. The cylinders 23a-23d are exhausted through the exhaust manifold 79 in the conventional manner for IC mode operation, i.e., to the IC mode exhaust line 49, while the cylinders 23e-23f are exhausted through the exhaust manifold 79 to the compressed air line 57, which is connected to the reservoir 31 to pressurize the reservoir.

In the embodiment of the system 21 shown in FIGS. 2-6, during a transition from operation in the AM mode (FIG. 3) to operation in the IC mode (FIG. 4), where the direction of fluid flow through the cylinders 23a-23f is reversed, it is desirable to minimize torque drop and avoid a period during which there is no power. According to an aspect of the present invention, this is accomplished by performing a series of steps including partially opening the IC mode exhaust line valve 51 so that air flow through the turbine 55 will boost air intake through the compressor 41. This may cause a pressure drop in the exhaust manifold 79 so valve timings will ordinarily need to be adjusted accordingly to maintain brake mean effective pressure (BMEP). Valve timings are typically adjusted based on pre-calculated maps, ordinarily using a variable valve timing mechanism (not shown).

Ordinarily at about the same time that the IC mode exhaust line valve 51 is partially opened, the AM exhaust line valve 63 is partially closed to build up pressure at the intake manifold 77. If this takes more than one cycle of the system, valve timings will need to be adjusted accordingly to maintain BMEP. Also, ordinarily at about the same time, the compressed air line valve 59 is partially closed. The IC mode exhaust line valve 51 may be partially opened, the AM exhaust line valve 63 may be partially closed, and the compressed air line valve 59 may be partially closed all at the same time, or at about the same time.

Ordinarily only after partially opening the IC mode exhaust line, partially closing the AM exhaust line valve 63, and partially closing the compressed air line valve 59, the air inlet line valve 47 is then completely opened and the CAC valve 37 is completely closed. It will ordinarily be desirable to have the air inlet line valve 47 open before the CAC valve 37 is completely closed to avoid potential turbo surge. The CAC valve 37 is ordinarily kept open initially when the air inlet line valve 47 is closed during AM mode to avoid potential turbo surge. However, the CAC valve 37 ordinarily should be fully closed in order for the turbocharger to boost the pressure of the intake manifold. Therefore, ordinarily, opening of the air inlet line valve 47 commences and then the CAC valve 37 is completely closed. The pressure of the intake manifold will start to build up after the CAC valve 37 is fully closed, with the air inlet valve 47 partially or fully open.

Figure 7:
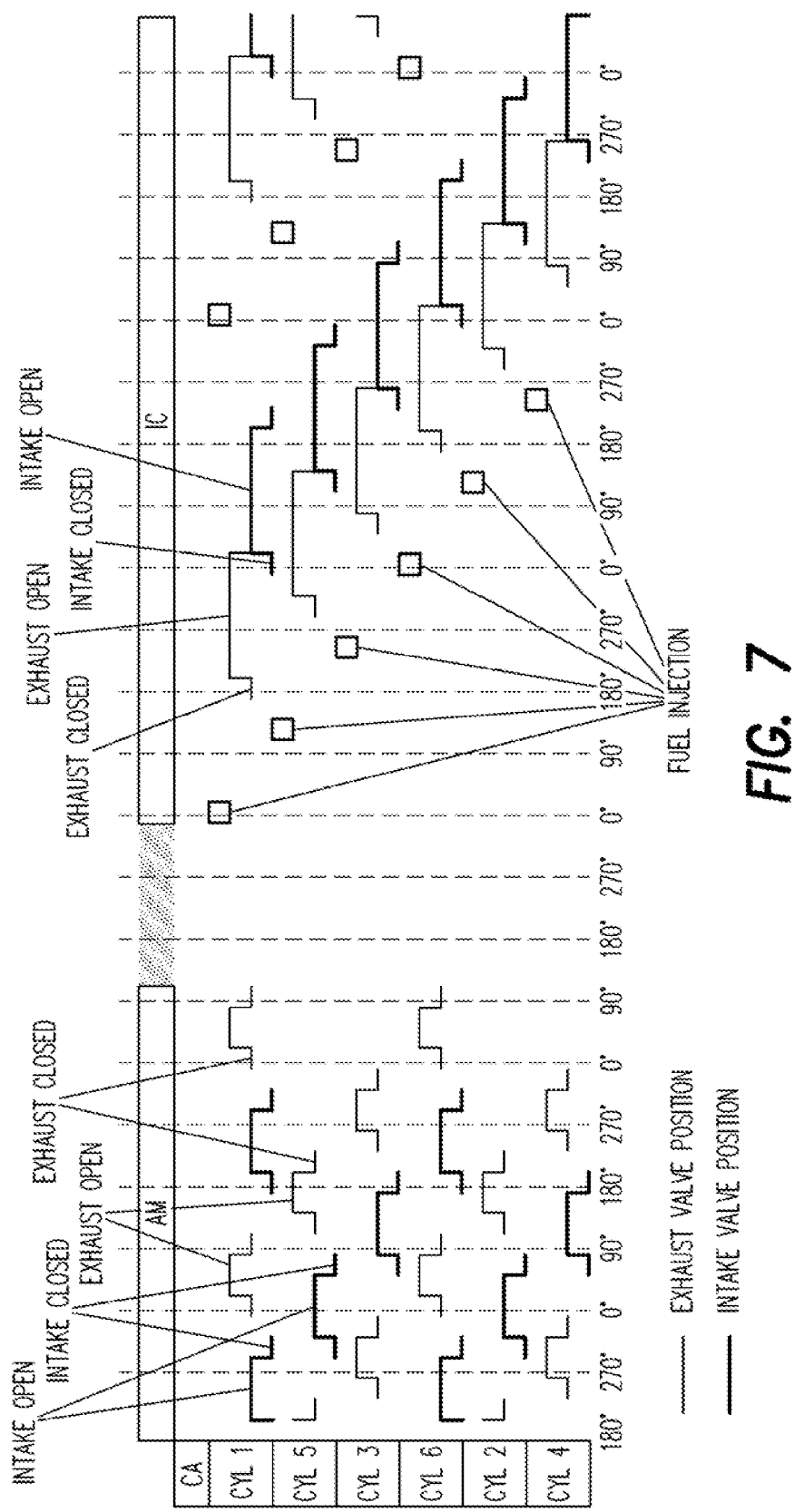
FIG. 7 is a graph showing intake and exhaust valve opening and closing sequences for a six cylinder engine according to an embodiment of the present invention during a transition from an air motor mode of operation to an internal combustion engine mode of operation.

Next, the compressed air line valve 59 can be completely closed. Ordinarily only after the compressed air line valve 59 is completely closed, the intake and exhaust valve 27a-27f and 29a-29f opening and closing timing sequence can be changed from an air motor timing sequence to an internal combustion engine timing sequence, as shown in FIG. 7. Ordinarily only after the timing sequence is changed, the AM exhaust line valve 63 can be completely closed, and the IC mode exhaust line valve 41 can be completely opened.

The compressed air line valve 59 will ordinarily be completely closed when the first of any of the following conditions are satisfied: (a) a speed of the turbocharger 43 reaches a predetermined turbocharger speed level, which may occur as a result of partially opening the IC mode exhaust line valve 51 with or without substantially simultaneously partially opening the air inlet line valve 47; (b) pressure in the IC mode exhaust line 49 falls to a predetermined IC mode exhaust line pressure; and (c) pressure in the reservoir drops to a predetermined reservoir pressure level.

During a transition from the IC mode to the AM mode, the system 21 will typically at least briefly operate in the AC mode as the IC mode exhaust line valve 51 closes and the compressed air line valve 59 opens. Depending upon the timing of the closure of the valves 51 and 59, such as if the exhaust line valve closes before the compressed air line valve opens and/or before combustion in all of the cylinders is completed, some combustion gases in the exhaust manifold 79 may be directed to the reservoir, although it will ordinarily be desirable to avoid this condition as combustion gases can have undesirable effects in the reservoir, such as corrosion.

Figure 1B:
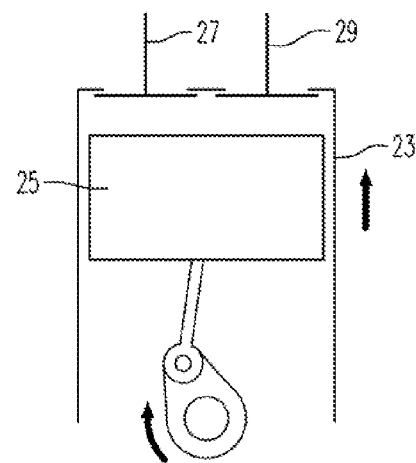
Figure 1C:
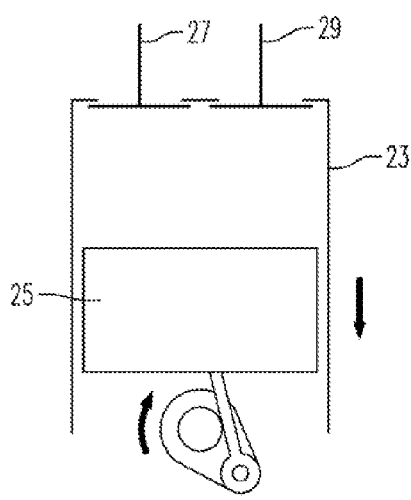
Figure 1D:
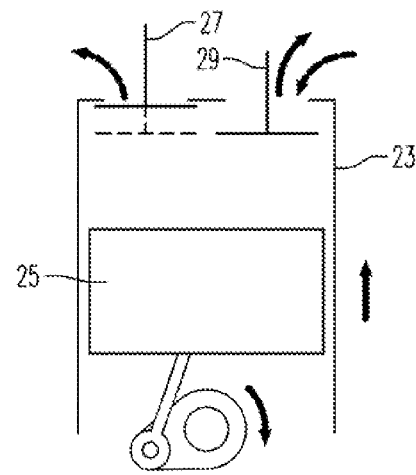

FIGS. 1A-1D show phases in conventional IC mode operation of a cylinder 23. During an intake phase as shown in FIG. 1A, the intake valve 27 is open and the exhaust valve 29 is closed as the piston 25 moves downward in the cylinder 23 and charge air enters the cylinder. During a compression phase as shown in FIG. 1B, the intake valve 27 and the exhaust valve 29 are closed as the piston 25 moves upward in the cylinder 23 to compress the air. After fuel injection and combustion, an expansion phase occurs as shown in FIG. 1C, during which the intake valve 27 and the exhaust valve 29 remain closed as the piston 25 is forced downward in the cylinder 23 by the combusting fuel. During the exhaust phase as shown in FIG. 1D, the exhaust valve opens 29 while the intake valve 27 remains closed and the upward movement of the piston 25 forces the exhaust gas out of the cylinder 23.

In an embodiment arranged like the system shown in FIGS. 2-6, during AM mode operation, in the cylinder shown in FIGS. 1A-1D, compressed air from the reservoir 31 can enter the cylinder 23 through the exhaust valve 29 as shown in phantom in FIG. 1A to force the piston 25 downward. Generally by or before a time when the piston 25 reaches a lowest point, the exhaust valve 29 is closed. As the piston 25 rises in the cylinder, the intake valve 27 is opened to permit air in the cylinder 23 to be exhausted as shown in phantom in FIG. 1D, after which the intake valve 27 is closed.

In an embodiment arranged like the system shown in FIGS. 2-6, during AC mode operation, in the cylinder shown in FIGS. 1A-1D, air can enter the cylinder 23 through the intake valve 27 as shown in FIG. 1A as the piston descends in the cylinder. At or near the point at which the piston 25 is at its lowest position in the cylinder 23, the intake valve 27 is closed and the exhaust valve 29 is opened. As the piston 25 rises in the cylinder 23, the air in the cylinder is forced out the exhaust valve 29 and may be stored in the reservoir 31.

A compressed air assist mode of operation can comprise drawing air from the reservoir 31 through the exhaust valve 29 and into the cylinder 23 during a first downward stroke of the piston 25 as shown in FIG. 1A, with or without the intake valve 27 also being open. Injected fuel can be combusted in the cylinder 23 to urge the piston 25 downward during a second downward stroke of the piston as shown in FIG. 1C. In this way, the compressed air in the reservoir can function in a manner similar to a compressor of a turbocharger.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. A method for controlling a transition from air motor operation to internal combustion operation in a hybrid internal combustion engine and air motor system, the hybrid internal combustion engine and air motor system comprising (a) a chamber including at least one intake valve, at least one outlet valve, and a drivable member, (b) an air inlet line including, upstream of the at least one intake valve, an air inlet line valve, (c) an internal combustion engine mode exhaust line comprising an internal combustion engine mode exhaust line valve downstream of the at least one exhaust valve, (d) a compressed air line comprising a compressed air line valve downstream of the at least one exhaust valve and upstream of a reservoir, and (e) an air motor mode exhaust, line comprising an air motor mode exhaust valve downstream of the at least one intake valve and the air inlet line valve, the method comprising transitioning from operation in the air motor mode to operation in the internal combustion engine mode by performing, in order, the steps of:
    a) partially opening the internal combustion engine mode exhaust line valve;
    b) partially closing the air motor exhaust line valve;
    c) partially closing the compressed air line valve; and
    d) completely opening the air inlet line valve after performing steps a), b), and c);
    e) changing an intake and exhaust valve opening and closing timing sequence from an air motor timing sequence to an internal, combustion engine timing sequence.

\* \* \* \* \*